June 2, 1959 J. I. YELLOTT ET AL 2,888,804
LOUVRED COOLANT FLUID ASH QUENCHING SYSTEMS FOR
PRESSURIZED COMBUSTORS UTILIZING POWDERED COAL
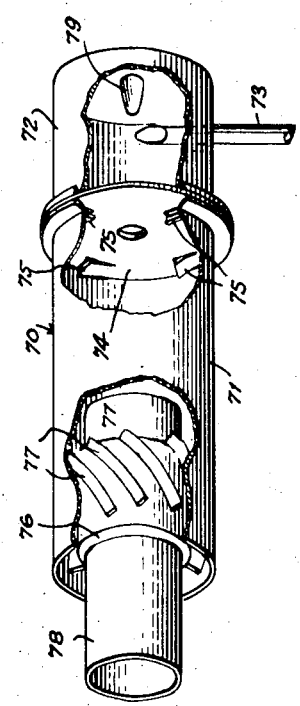
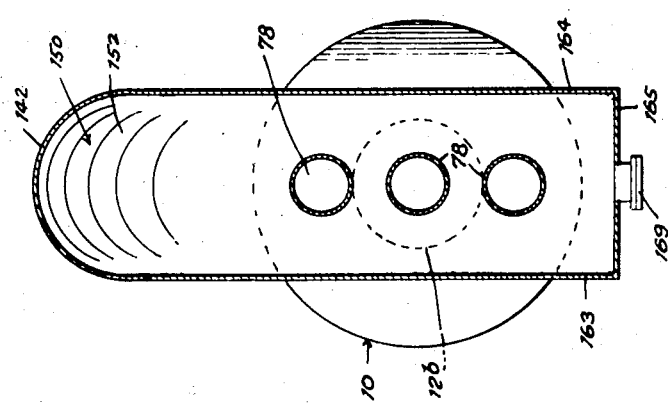

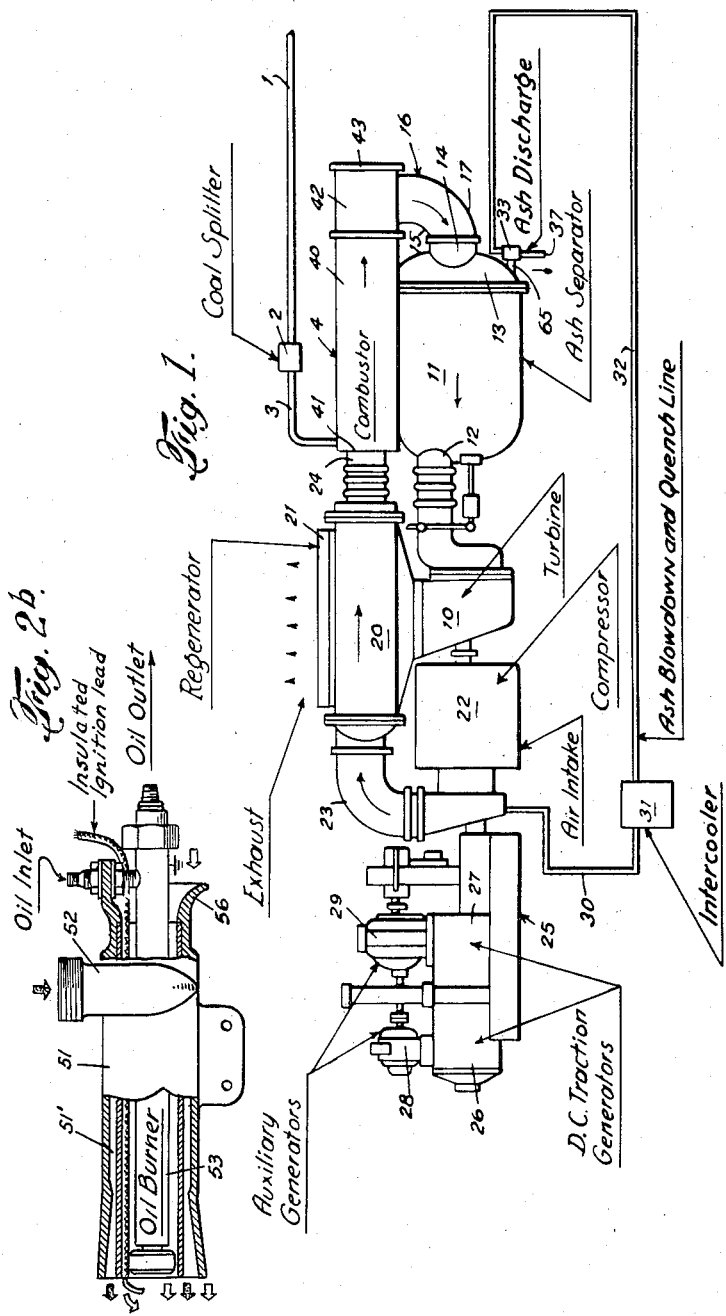

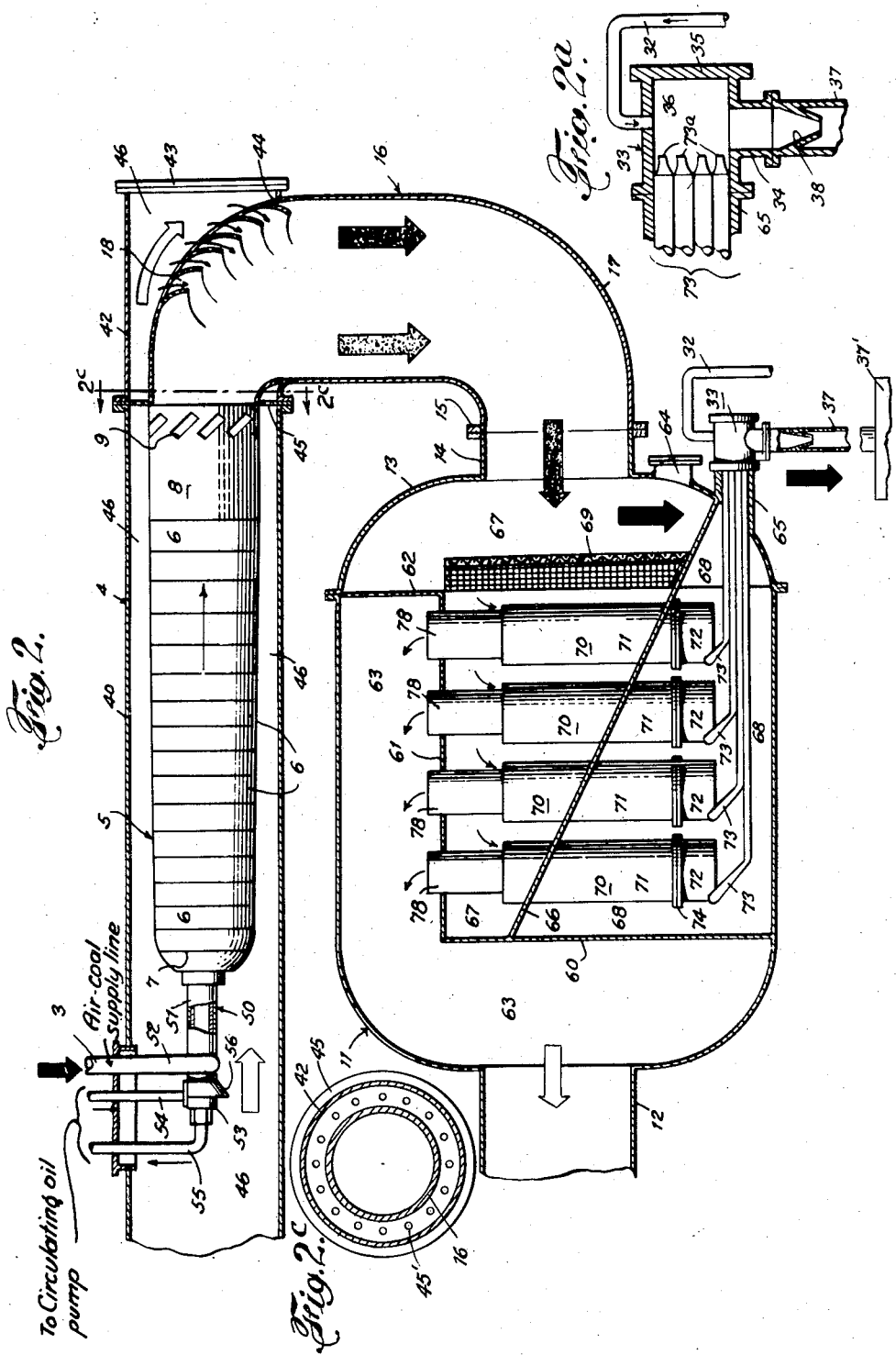

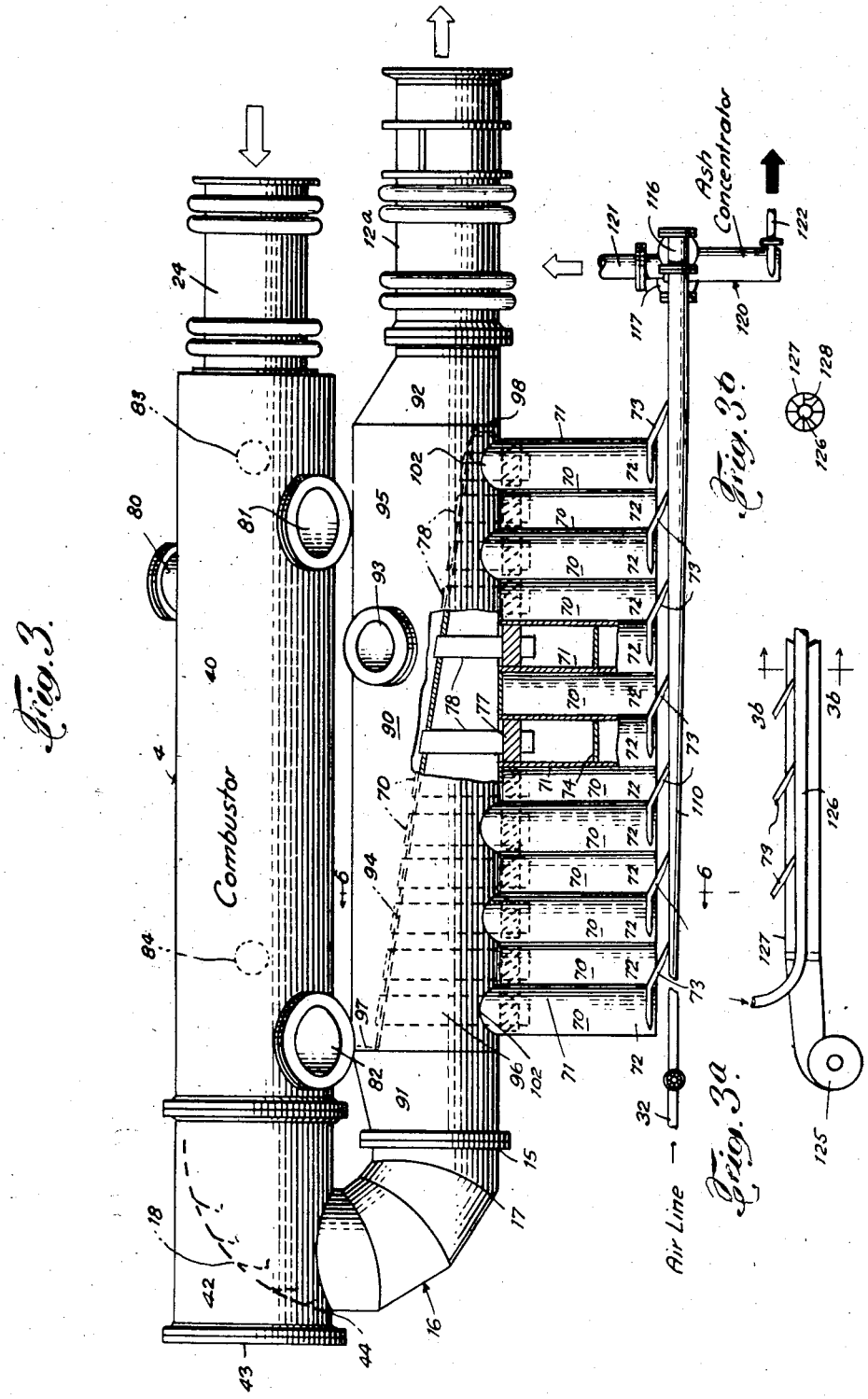

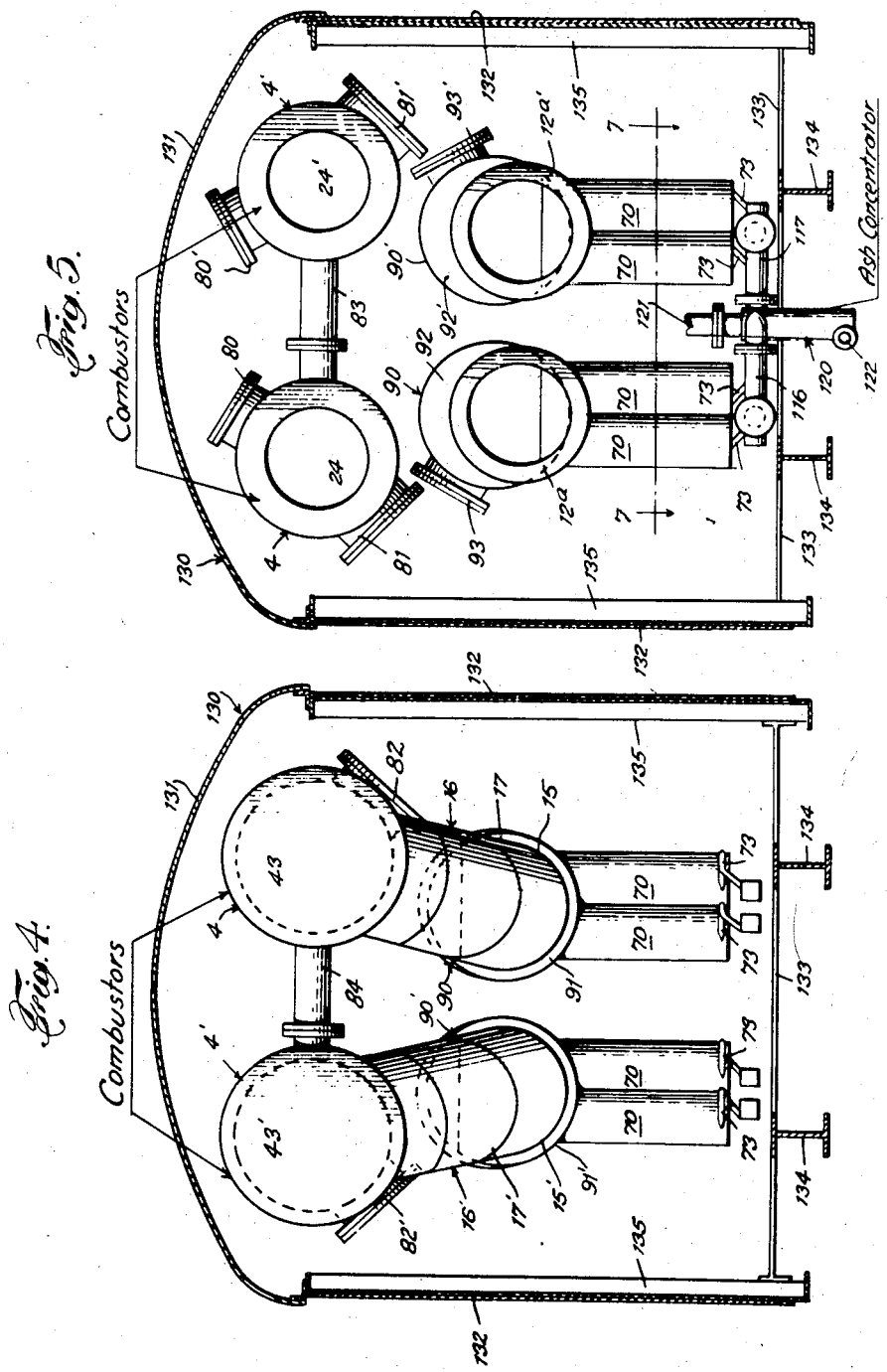

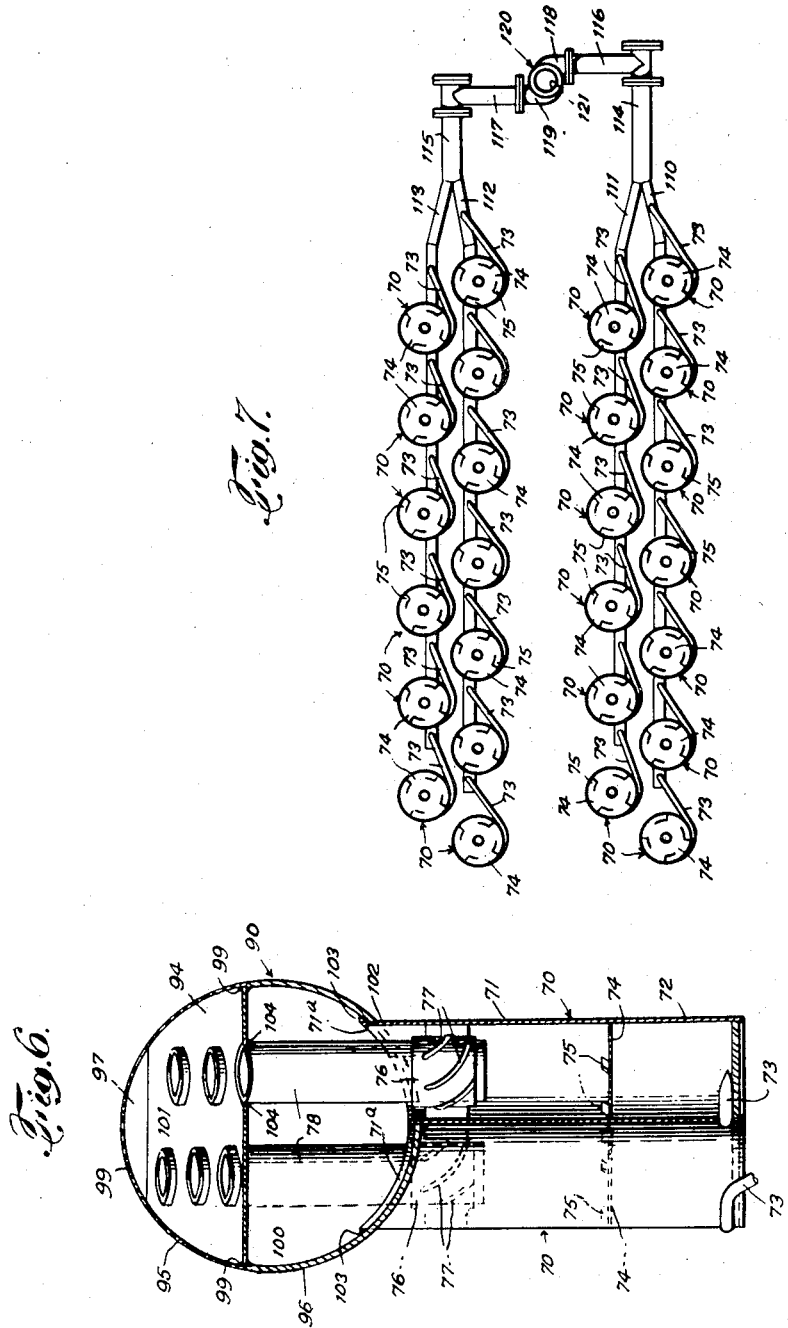

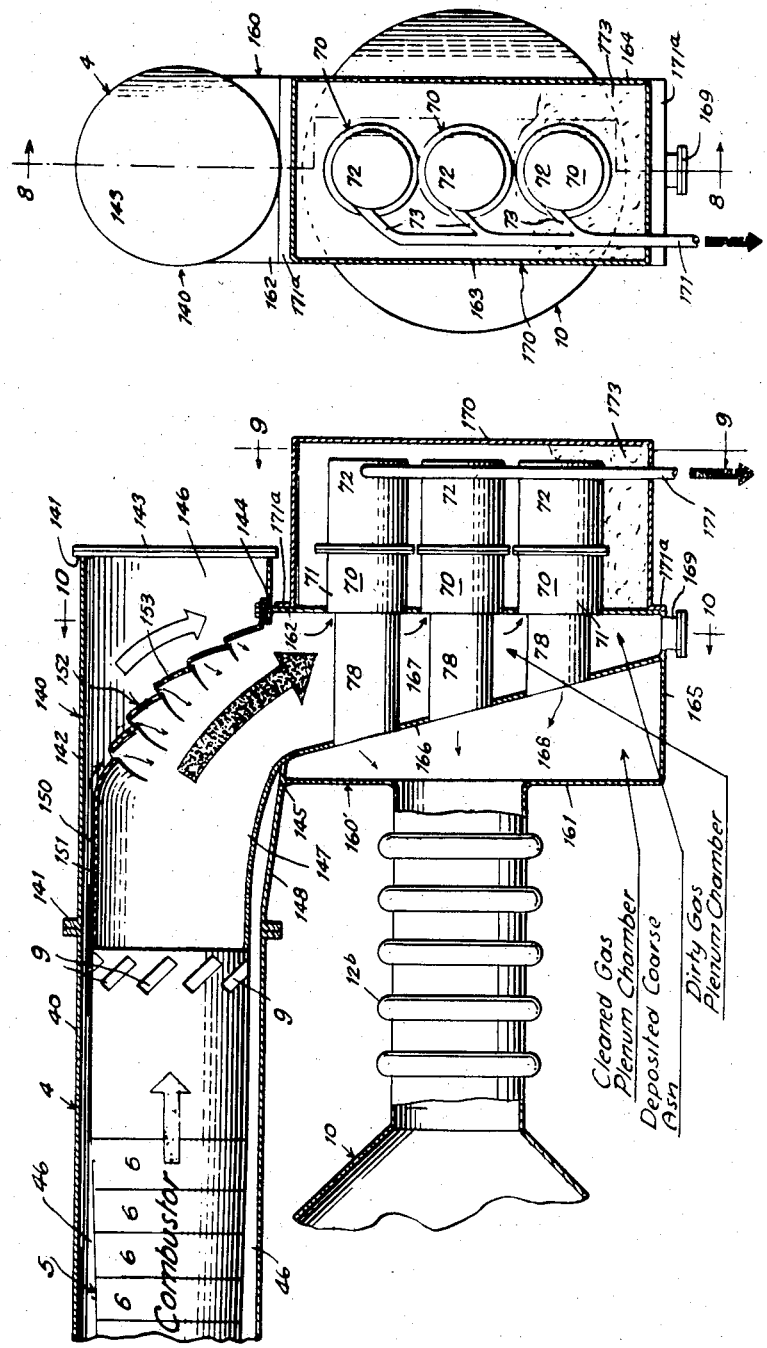

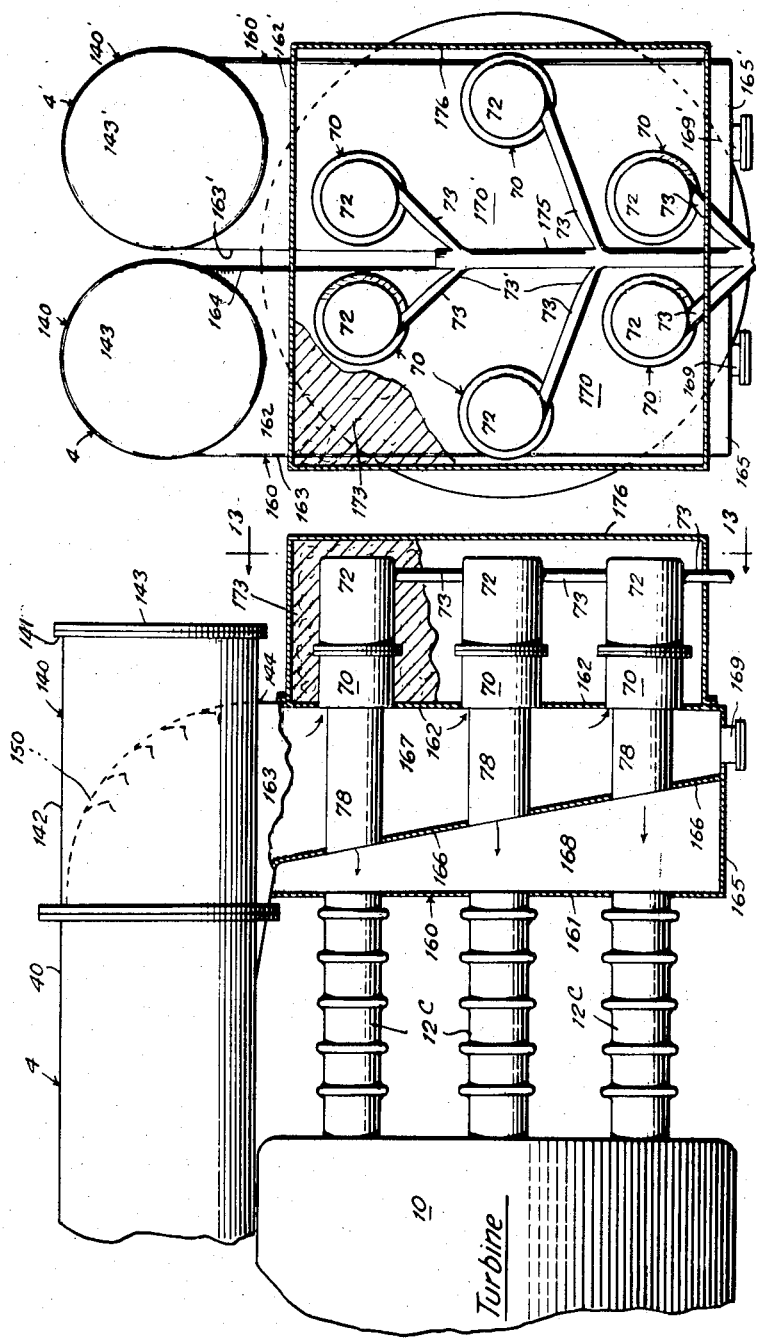

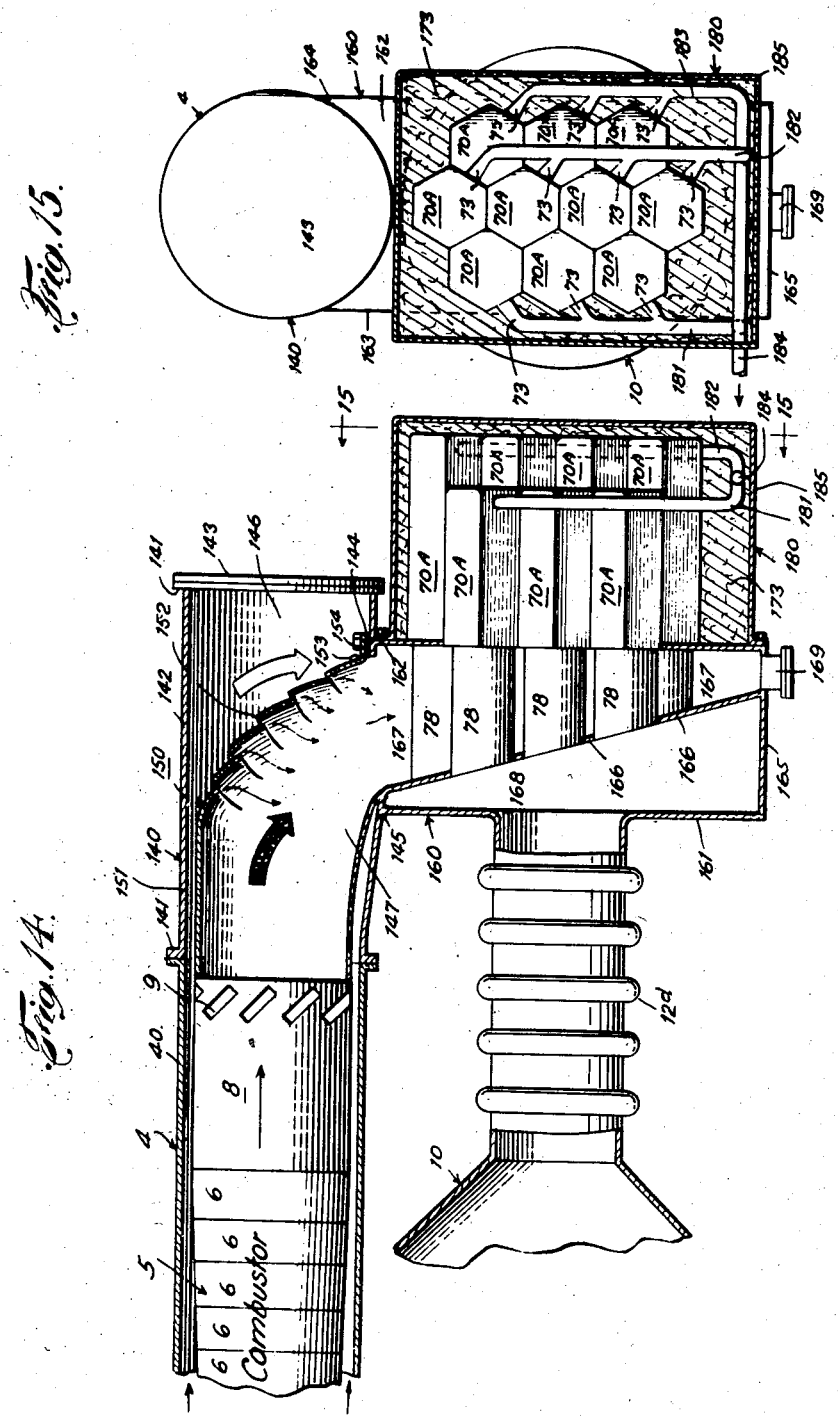

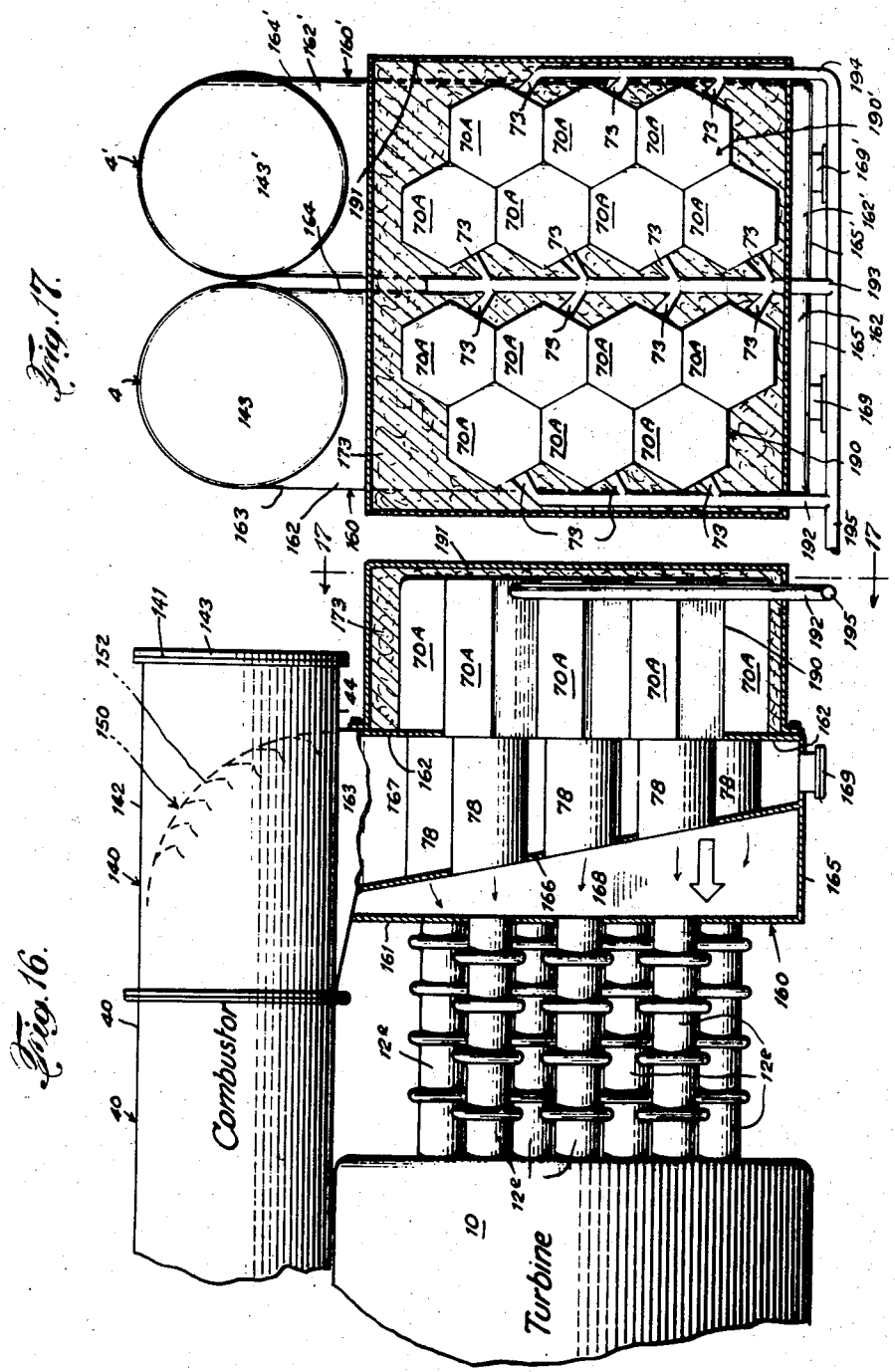

United States Patent Office 2,888,804
Patented June 2, 1959

2,888,804

LOUVRED COOLANT FLUID ASH QUENCHING SYSTEMS FOR PRESSURIZED COMBUSTORS UTILIZING POWDERED COAL

John I. Yellott, New York, N.Y., and Peter R. Broadley, Elizabeth, N.J., assignors to Bituminous Coal Research, Inc., Washington, D.C., a corporation of Delaware Original application January 7, 1953, Serial No. 330,077. Divided and this application April 4, 1955, Serial No. 499,123

15 Claims. (Cl. 60—39.46)

This invention relates to combination ash quenching, separating and disposal systems for power plants with powdered coal-burning pressurized combustors utilizing powdered coal, dispersed in pressurized streams of combustive air, as a gasiform combustible. More particularly, the invention relates to such systems as elements of gas turbine power plants for supplying ash and combustion residue-free pressurized motive fluid for the turbines. This application is a division of our application, Serial No. 330,077, filed January 7, 1953, for Coal-Burning Gas Turbine Power Plants Incorporating Novel Self-Supporting and Pressure-Sustaining Vortical Whirl Separators Together With Improved Ash Quenching and Blowdown Means.

The pressurized combustion of fluidized, residue-forming fuels gives rise to a number of operating conditions that are not met with in the operation of conventional power plants burning powdered coal, which may be briefly summarized as follows:

(1) In conventional power plants burning powdered coal, the unburned combustibles in the ash rarely exceed 5 percent; in the Yellott systems (pressurized combustors), the ash is found to contain 50–60 percent unburned, or incompletely burned combustible particles;

(2) The time of residence in a combustor; conventional systems—3.0 seconds; Yellott system—0.150 second.

(3) Temperature of gas carrying the uncombusted or incompletely combusted combustible particles: conventional systems—350–450° F. (after delivery to a use device, e.g., a steam boiler); Yellott pressurized system—1300° F.;

(4) Heat release: conventional systems—30,000 B.t.u./hr./cu. ft.; Yellott system—about 1,000,000 B.t.u./hr./cu. ft.

The implications of the above figures were most forcibly brought home to applicants by the fact that in their continuing studies on the pressurized combustion of powdered coal, it was found that even a momentary delay or dwell of a combustible particle in an ambient pressurized atmosphere (<80–90 p.s.i.) at 1300° F., resulted in a marked recalescence of the combustible particles and destruction of the ash separating equipment in immediate contact therewith. Tanks and ash containers receiving the ash were quickly raised to white heat and the separators burned out. All of this is in marked contrast to the conditions obtaining in prior art combustion systems, where even at operating pressures of 50 p.s.i., the temperature of the outgoing gases from a combustion system rarely exceeded 1000° F.

Thus, applicants were faced with a hitherto unknown problem, and no teaching available as to the problem or how to solve it. They studied and correctly evaluated and defined the problem, and then solved it. Reduced to its essential, the problem is to render potentially recalescent combustible particles incombustible, and to remove them, pneumatically, from the separation system with all possible speed. This was accomplished by projecting the solid, incandescent combustion residues into a body of coolant gas to quench the residues, while the combustion gases and contained combustion residues are being delivered to the ash separation system, and the elimination of even a momentary dwell of any highly heated particles in the separators, by providing continuous pneumatic blowdown of all matters separated out in the separators, and their positive, pneumatic removal from the ash separation system.

Thus it will be seen that the immediate quenching of all combustion residues before passage through the ash separators is of vital importance.

The quenching of ash and other combustion residues, particularly unburned coal particles or agglomerates, must be effected as quickly as possible to prevent after-combustion in the pressurized ash separating equipment. The improvements of the present invention permit the separation of coarse combustion residues and unburned combustibles by projecting them from out of the rectilinearly flowing stream of motive fluid, combustion gases plus cooling and diluting secondary air, in which they are entrained, into a co-flowing, marginal stream of cooler, secondary air. This secondary air is introduced through louvers in the top of a down-comer duct mounted in the discharge end of the combustor casing, which casing, as will be described more in detail hereinafter, subserves the function of a secondary air plenum chamber. The down-comer duct causes an abrupt change in the direction of flow of the horizontally projected stream of ash- and combustion residue-bearing motive fluid gases, with the result that the said heavier entrained material is transferred to the down-flowing marginal stream of secondary air, and is cooled and quenched therein, according to the "ash-transfer" principle, enunciated in the application of one of us, John I. Yellott, Serial No. 148,594, filed March 9, 1950, for Method and Apparatus for the Separation of Particulate Material From Entraining Gaseous Fluids, now Patent No. 2,650,675, issued September 1, 1953.

The downcomer ducts can be of various configurations, according to the particular installations in which they are to be incorporated, and are severally hermetically connected to the input plenum chambers of the novel ash separator batteries herein. Means are provided at the bases of the ducts, or in fore chambers of the input plenum chambers, for receiving and withdrawing separated, quenched residues from the motive fluid, the fly ash contained in the fluid being separated therefrom in its passage through the battery of special vortical whirl separators forming an integral part of the ash separator system herein, and continuously removed from the system in a blowdown stream of motive fluid comprising up to 1–1½ percent of the total throughput volume of the fluid.

It is, therefore among the features of novelty and advantage of the present invention to provide coal burning gas turbine power plants for motivating generators of generating electric locomotives, the power plants being characterized by improved combustion and ash separating equipment.

A further feature of novelty and advantage of the invention herein is the incorporating of special ash transfer and quenching means in the combustor discharge ducts.

An additional feature of novelty and advantage is the provision of specially louvered downcomer ducts coupling combustion chambers with ash separating equipment, the louvered ducts receiving cooling secondary air from plenum chambers in combustor casings.

With these and other important features of novelty and advantage which may be incident to the improvements herein, the invention consists in the parts and combinations to be hereinafter set forth and claimed, with the understanding that the several necessary elements comprising the invention may be varied in construction, proportions and arrangements, without departing from the spirit and scope of the appended claims.

In order to make the invention more clearly understood, there is shown in the accompanying drawings means for carrying the same into practical effect, without limiting the improvements in their useful application to the particular constructions, which, for the purpose of explanation, have been made the subject of illustration.

In the drawings, like numerals refer to similar parts throughout the several views, of which:

Figure 1 is a schematic showing of a coal burning, gas turbine-powered, generating electric locomotive power plant incorporating improved combustion and tank enclosed ash separating means;

Fig. 2 is a longitudinal section through a combustor and associated ash separator of Fig. 1, showing novel ash transfer means for initially separating and quenching incandescent and incompletely combusted fuel particles, and vortical whirl ash separating means housed in a pressure-sustaining vessel incorporating dirty gas input and cleaned gas output plenum chambers in mutual heat-exchanging relation;

Fig. 2a is a vertical axial section through the blowdown manifold 33 of the separator battery of Figs. 1 and 2, showing the flow-restrictor discharge ends of the individual blowdown lines together with the coolant or quenching air inlet, and the manifold discharge line incorporating a flow restrictor;

Fig. 2b is a detail view, partly in broken section, of the burner shown in Fig. 2;

Fig. 2c is a sectional view along line 2—2 of Fig. 2, showing the arrangement of the baffle at the discharge end of the combustor;

Fig. 3 is an elevational view of another combustor and one unit of an associated ash removal system having juxtaposed dirty gas inlet and cleaned gas outlet plenum chambers in mutual heat-exchanging relation, and incorporating a battery of special vortical whirl separators, the individual separators forming pressure vessels provided with tangential blowdown lines for ash discharge, the blowdown lines incorporating flow restrictor means and spacedly discharging into a flaring blowdown manifold coupled to a concentrator, the manifold having a valved coolant air inlet;

Fig. 3a is a diagrammatic showing of an external tubular forced air coolant means for the ash discharge manifold of Fig. 3;

Fig. 3b is a cross-section taken on line 3b—3b of Fig. 3a, and showing radial extended surface coolant fins and air ducts formed thereby with the external sheath tube and the manifold;

Fig. 4 is a transverse vertical section of the power car of a generating electric locomotive showing, in end elevation, the discharge ends of a pair of combustion units coupled to their ash separator units, as shown in Fig. 3;

Fig. 5 is a view similar to Fig. 4, showing the secondary air input ends of the combustors and the discharge output ends of the ash separator assemblies and the coupling of their ash blowdown systems to a common ash concentrator and blowdown unit;

Fig. 6 is a transverse section taken on line 6—6 of Fig. 3, showing the orientation of the reverse flow vortical whirl separator units of the ash separators, and the mutual heat-exchanging relation of the dirty gas input and cleaned gas output plenum chambers;

Fig. 7 is a horizontal cross-section, taken on line 7—7 of Fig. 5, showing a pair of separator batteries and their constituent separator tubes with individual blowdown lines, together with the ash discharge manifolds and terminal vortical whirl ash concentrator coupled thereto;

Fig. 8 is a longitudinal section, taken on 8—8 of Fig. 9, through the discharge end of a combustor incorporating a downcomer duct having secondary air admitting louvers, and a modified ash separator battery having a box-like plenum chamber casing incorporating juxtaposed dirty gas inlet and cleaned gas outlet plenum chambers in mutual heat-exchanging relation, the dirty gas plenum chamber being hermetically coupled to the downcomer duct, with the individual vortical whirl separator units of the ash separator being shown in horizontal elevation, mounted exteriorly of the casing, and encased in an insulating housing;

Fig. 9 is a cross-section, taken on line 9—9 of Fig. 8, showing flow restrictive ash blowdown lines and discharge manifold therefor;

Fig. 10 is a cross-section of an input plenum chamber taken on line 10—10 of Fig. 8;

Fig. 11 is an elevational view, partly in broken section, of a horizontally mounted vortical whirl separator, showing the details of the barrel or primary separator chamber and the adjacent discharge chamber with its tangential blowdown line;

Fig. 12 is a view similar to Fig. 8, showing multiple cleaned gas expansion ducts axially aligned with the cleaned gas discharge tubes of the separator units, and coupling the gas turbine and the cleaned gas output plenum chamber;

Fig. 13 is a vertical cross-section, taken on line 13—13 of Fig. 12, and showing duplex combustor and associated ash separator units, together with ash blowdown lines and common discharge manifold;

Fig. 14 is a longitudinal axial section through a combustor and associated ash separator, the flame tube and ash separators being shown in elevation, the separators being hexiform and mutually juxtaposed in a honeycomb assembly;

Fig. 15 is a cross-section taken on line 15—15 of Fig. 14, showing the rear elevation of the honeycomb assembly and associated ash discharge manifolds;

Fig. 16 is a view similar to Fig. 14, showing a honeycomb arrangement of hexiform vortical whirl separator units, together with a corresponding number of expansion ducts axially aligned with the cleaned gas discharge tubes of the separator units, and coupling the cleaned gas outlet plenum chamber to a gas turbine, and Fig. 17 is a cross-section, taken on line 17—17 of Fig. 16, showing the mounting of duplex combustors and associated ash separators severally incorporating honeycomb assemblies of hexiform ash separator units, together with ash blowdown lines and manifolds therefor.

Referring now to Figure 1, there is shown, schematically, a gas turbine-powered generating electric power plant, particularly adapted for use in generating electric locomotives. Mechanical transmission of power from the turbine shaft is also envisioned. A special feature of the power plant herein is that it uses pulverized coal as a primary fuel for the generation of pressurized combustion gases, which, when suitably diluted with cooling air, and thereby brought to optimum turbine operating temperature, serve as the motive fluid for a gas turbine. Coal and other residue-forming fuels, such as bunker oil, introduce fine ash, incandescent and incompletely burned combustible particles, and other residues into the combustion gases, which residues and ash must be removed from the motive fluid and immediately quenched to avoid damage to the turbine blading and the ash separator equipment.

In the power plant, diagrammatically illustrated in Fig. 1, a high pressure combustive air line 1 delivers a streaming entrainment of combustive air-borne pulverized coal, from a suitable coal supply, not shown, to a coal splitter 2, which divides the coal-bearing combustive air stream into a plurality of equal streams, each of which is delivered to an air-coal feed line 3 of a combustor 4. While the invention will be generally described with reference to a single combustor, the invention comprehends the use of a plurality of combustors, as illustrated in each of Figs. 4, 5, 13, and 17, and each combustor of a plural assembly will be fed by a feed line, severally designated by the numeral 3, and jointly coupled to the coal-splitter 2. The gas turbine system illustrated herein is of the open cycle type, and the component parts will be described generally in their mutual cooperative assembly, before proceeding to a specific consideration of the novel combustor and ash separator assemblies forming the basic features of the invention herein.

A gas turbine 10 receives cleaned motive fluid from pressure-sustaining ash separator 11, through an expansion duct or ducts, designated generally by the numeral 12. The separator housing 11 houses a plurality of individual vortical whirl separators, whose structure and function will be adverted to more in detail hereinafter. The ash separator housing 11 has a flanged head 13, mounting one or more symmetrically disposed flanged inlet ducts 14, depending upon the number of combustors utilized in a particular installation. The inlet ducts 14 are coupled to the flanged discharge ends 15 of downcomer ducts 16 having a bottom elbow section 17, and a louvered top elbow section 18 mounted in the discharge end of the combustor casing and in fluid communication with the flame tube thereof. The elbow sections 17 and 18 connect parallel legs of the U-shaped duct 16, and face in the same direction. Because of this feature, motive fluid from the combustor will undergo two abrupt changes in direction, resulting in a double change in direction and complete reversal of flow before entering the ash separator 11.

The turbine discharges exhaust motive fluid through stack 20 in which may be mounted a regenerator, indicated generally by the numeral 21, in heat-exchanging relation with the exhaust gases. The regenerator is supplied with combustion and cooling air from compressor 22, through duct 23. A second expansion duct or ducts 24 delivers the regeneratively heated air to the combustor or combustors 4, as the case may be.

The turbine shaft is operatively coupled to the air compressor 22, and to the generator assembly, designated generally by the numeral 25, and incorporating D.C. traction generators 26, 27, and auxiliary D.C. generators 28, 29, respectively used for field excitation of the main generators, and for lighting and the like.

As will appear more fully hereinafter, one of the features of the present invention is the use of a gaseous coolant, such as air, to cool the separated ash discharged in the blowdown streams from the special vortical whirl separators into the ash discharge manifolds. One method of attaining this result is indicated in Fig. 1, wherein air from duct 23 is passed through line 30 to cooler 31, and thence through line 32 to ash discharge manifold 33, which is coupled to the flanged head 13 of the pressure-resistant ash separator housing 11. The cooler 31 may be of any conventional type, such as a fan for passing cool ambient air in heat-exchanging relation with the pressure air line, or it may comprise a water-jacketed cooler. Where the line 30—32 is of sufficient length, and is exposed to the ambient air, the cooler 31 may be dispensed with. In any event, the function of cooler 31, or its equivalent, is to reduce the temperature of the compressed air in line 30—32 to below 400° F. (which is the threshold ignition temperature of powdered coal in air), before its introduction as a coolant into the ash blowdown system.

Turning now to Fig. 2, the specific details of the improved combustor and ash separator installation and their cooperative assembly will be considered. The combustor 4 is comprised of a main pressure sustaining body portion of casing 40, an inlet end 41 (Fig. 1), receiving air inlet duct 24, and an end cap piece 42. The end cap piece is flanged at both ends, and is closed with a cap plate 43. The member 42 is essentially a continuation of casing 40, and is of the same diameter. The upper, louvered elbow section 18 of the U-shaped downcomer duct is received in a suitable aperture in the wall of member 42, as shown in Fig. 2, and is hermetically secured therein by welding, indicated generally at 44. A combustion chamber 5 is comprised of a plurality of spacedly interfitted rings 6, a burner dome section 7, and a terminal mixing and discharge section 8 incorporating an annular array of radial apertures 9. An apertured, circular baffle plate or dam 45 is secured around the discharge end of combustor casing 40, the arrangement of the baffle 45 and apertures 45′ therein, being shown in Fig. 2c. The rings of the flame tube are desirably supported for free radial movement, and simultaneously held from substantial axial movement by the special mounting means disclosed and claimed in the patent application of Frederick D. Buckley, Serial No. 257,165, filed November 19, 1951, now Patent No. 2,823,627, issued June 21, 1957 for Cold Wall Combustor With Flexibly Mounted Flame Tube. A plenum chamber 46 for secondary air is defined by and between the inside of casing member 40 and the flame tube 5. This plenum chamber extends downstream into the end of the combustor defined by member 42. A special burner, designated generally by the numeral 50, is mounted in the burner dome 7 of the combustor tube 5. This burner is more particularly disclosed and claimed in the application of Paul M. Rotzler, Serial No. 257,079, filed November 19, 1951, for Powdered Coal Burner for Pressurized Combustors, and will not be described in detail, except as to the gross structure necessary to an understanding of the invention herein.

The burner 50 has a tubular body 51 extending into the burner dome 7. Member 51 is essentially a double-walled hollow tube (Fig. 2b) having an annular discharge orifice for the chamber 51′ defined by and between the double walls. A tangential supply pipe 52 discharges into the rear end of the annular chamber of member 51, and receives a streaming entrainment of combustive air-borne pulverized coal from a feed line 3, described hereinabove. The burner 50 is a duplex structure and mounts an oil burner 53 axially of the member 51. The oil burner is provided with inlet and outlet lines 54, 55, respectively, which lines are coupled to a pressurized oil supply, so that the burner is supplied with a circulating stream of pressurized oil. An air scoop 56 is mounted at the upstream end of member 51 and about oil burner 53, and serves to direct secondary air from the plenum chamber 46 in the combustor casing into the annular passage or duct defined by and between the oil burner and the circumjacent air-coal burner.

In the special form of ash separator illustrated in Figs. 1 and 2, there is shown a pressure-sustaining, heat resisting casing 11 having a dirty gas input duct 14 and a cleaned gas discharge duct 12. The casing 11 is divided internally into three chambers in the following manner: An internal vertical wall member 60 is hermetically secured to the sides and bottom of casing 11 upstream of the discharge duct 12, its top edge being disposed below the top of the casing but above the top of the outlet duct 12. A second, horizontal internal wall member 61, extends from the top of member 60 to the curviform head section 13 of the casing, and is hermetically secured to the wall of the casing and to the wall member 60. A riser 62, or vertical wall member, is hermetically secured across the upstream edge of partition member 61, and to the casing wall, as shown. The internal wall members 60, 61 and 62, will be seen to define a cleaned gas output plenum chamber 63 with the inner surface of casing 11. The curviform head 13 of casing 11 is provided with a clean-out port 64 below the input duct 14, and with a subjoined flanged stub pipe or collar 65 hermetically secured to blowdown chamber 33. A fourth partition wall member or slope sheet 66 is diagonally disposed in the casing 11, as shown, with its sides and lower edge conformed to the interior of the casing and hermetically secured thereto, and the upper, or downstream edge, hermetically secured to partition member 60, and in subjacent, spaced relation to horizontal partition member 61. Diagonal partition member 66 defines a dirty gas input plenum chamber 67 with internal wall members 60, 61, 62, and the casing wall, including the curviform head 13. Member 66 also defines a sheath section 68 with partition member 60, and the inner surface of the casing, including section 13 thereof. A screen 69 serves to divide plenum chamber 67 into a fore chamber and an after chamber.

The casing 11, with its internal partitions, as described immediately above, serves as a pressure-sustaining housing for a battery of special vortical whirl separators of the type described and claimed in our application Serial No. 257,702, filed November 23, 1951, and which we designate as the "Dunlab Tube." The special structural details of the novel vortical whirl separators of our said invention are shown herein in Figs. 3, 6, 7, and 11, and the description thereof will be repeated here, in view of the critical importance of these devices as integral parts and key members of the ash separating systems herein. These devices, designated generally by the numeral 70 (Fig. 11), comprise primary separator or barrel sections 71 and adjacent bottomed discharge sections 72 provided with tangential blowdown lines 73, as shown. An axially apertured diaphragm 74 is mounted between the barrel and discharge sections of the separators. These diaphragms are provided further with marginal struck-up skimmer blades 75, extending into the barrel section and defining peripheral apertures establishing fluid communication between the said barrel and discharge sections, whereby centrifugally separated solids from the barrel section are delivered into the discharge section in spinning streams of motive fluid, and further separation of the solids then takes place with the eventual removal of the solids in a blowdown stream of motive fluid discharged through the tangential blowdown line 73. At the intake end of the barrell section there is provided peripheral vortical whirl imparting means for incoming dirty gas, and an axial cleaned gas outlet tube. In the form shown herein, a collar member 76 mounts peripheral vanes 77, severally set to give a discharge angle of substantially 30°. The outer edges of the vanes 77 are in frictional engagement with the inner surface of the cylindrical barrel section, and retain the collar 76 fixedly secured in the mouth of the barrel section of the separator. A cleaned gas discharge tube 78 is axially secured in the collar 76 and extends an appreciable distance on both sides thereof, so as to depend into the barrel section to place its mouth well below the downstream edges of the vanes 77. The output or discharge end of the tube can extend any desired distance, depending upon the particular installation. Wear resisting plugs 79 (Fig. 11) may be axially disposed in the bases of the discharge sections to prevent abrasion.

As shown in Figs. 1, 2, and 2a, a blowdown chamber or manifold 33 is hermetically secured to the flanged nipple 65 of pressure-sustaining casing 11. The member 33 comprises a T-shaped connector, including a depending, flanged leg 34. The cross-arm or top of the T is hermetically closed by end plate 35, in any suitable manner, and defines a plenum chamber 36 with the body of the T. A flanged ash discharge duct 37, incorporating a flow restrictor means, such as convergent nozzle 38, is subjoined to the depending leg 34. The ash blowdown lines 73 have their terminal ends fitted in duct 65 of the separator casing 11, and extending into plenum chamber 36. The terminal ends of the blowdown lines 73 are shaped to form convergent discharge nozzles, designated generally by the numeral 73a, and these nozzles function as flow restrictors, preventing blowback into the vortical whirl separators 70. These restrictors are purposely incorporated in each blowdown line 73 in order to equalize the blowdown flows from the various separator tubes 70. Each such restrictor can be adjusted to compensate for the length of its blowdown line, the presence of bends in efferent lines, and other like conditions affecting the flow of solids-bearing gaseous fluids through the blowdown lines. The pressure drop across each such restrictor may, if desired, be integrated into a flow measuring system, with alarm devices, to enable the plant operator to determine whether the tubes are severally functioning in a proper manner. Nozzle 38 serves to reduce the pressure of the ash blowdown stream introduced into discharge duct 37, so that the pressure of the stream will be reduced to a point where final ash concentration and storage can be made at atmospheric pressure, in a suitable container 37'.

Considering the operation of the motive fluid generating and cleaning system illustrated in Figs. 1, 2, and 2a, and with particular reference to the detailed showing of Fig. 2, it will be seen that combustion gases generated in combustion chamber 5 of combustor 4, are initially cooled and reduced to optimum turbine operating temperature by admixture with cooling, secondary air introduced into the combustion chamber through the channels or annular openings formed between the annular ring sections 6 of the flame tube. Final mixing of the secondary air with the combustion gases is effected in mixing chamber 8, into which more secondary air is radially projected through the annular array of apertures 9. The motive fluid thus discharged from the mixing chamber will be projected against the curviform louvered upper surface of upper leg 18 of the downcomer duct 16. As more clearly set forth in Yellott Patent 2,650,675, of September 1, 1953, hereinabove identified, the cooler, secondary air from the plenum chamber 46 will flow through the louvered openings and be deflected forwardly and downwardly against the rear surface of duct 16, forming a down-flowing film of cooling air thereover. The highly heated motive fluid (ca. 1350° F.) from the combustion tube will impinge against the said down-flowing film of cooler air and will form a second layer, co-flowing therewith, and without substantial mixing of the co-flowing streams, while the heavier combustion residues and uncombusted particles and agglomerates originally dispersed in and carried by the motive fluid stream will be transferred into the cool air film and be quenched therein and carried downwardly thereby against the curviform surface of bottom curviform section 17 of duct 16, to be deposited in the bottom of the fore chamber of inlet plenum chamber 67. As the motive gas passes through screen 69, the residual coarse solids will be separated out and fall to the bottom of the fore chamber, whence they may be removed intermittently through clean-out port 64, or continuously in a special separator of the type disclosed and claimed in Yellott Patent 2,652,792, issued September 22, 1953, for Pressurized Combustion and Ash Removal System for Coal-Fired Gas-Turbine Power Plant.

The preliminarily screened motive fluid flows into the after section of plenum chamber 67 and into the vortical whirl ash separators 70, of the ash separator battery. In these devices the ash is separated from the motive fluid, and is discharged to the ash disposal system through blowdown lines 73, chamber 33, and ash discharge line 37. As indicated hereinabove, a coolant gas stream may be introduced into the chamber 33 through line 32 from cooler 31, whereby any unquenched incandescent combustible residues entrained in the blowdown gas are cooled below the ignition point (ca. 400° F.), and the blowdown stream is cooled to the ambient air temperature. The cleaned motive fluid gas from the separators 70 is discharged, through the individual cleaned gas discharge tubes 78, into the cleaned gas output plenum chamber 63, whence it is delivered through expansion duct or ducts 12, to a gas turbine 10. It is to be noted that both the coarse and fine ash and combustion residues are separated and removed from the system, and concomitantly quenched and cooled, without recourse to the use of moving mechanical separating equipment. This novel feature is made possible by the use of 0.5% to 1.5% of the original volume of the motive fluid generated, as ash blowdown streams, with or without the return of the cleaned gas from the final ash concentration and disposal step to the motive fluid gas system.

The system illustrated in Figs. 1, 2, and 2a, and described immediately hereinabove, utilizes a pressure-sustaining vessel 11, as a housing for the ash separator battery of special vortical whirl separators. This tank or vessel 11, is quite bulky, and is required to be made of heavy gauge, heat-resistant stainless steel, which is in critical supply, and is very costly.

Important savings in equipment costs, as well as in installation, maintenance and operation costs, are made possible by the novel power plant systems illustrated in Figs. 3–17, and including a first modification, illustrated in Figs. 3–7, and second and third modifications, illustrated in Figs. 8–17. The third modification is characterized by a vortical whirl separator having a hexiform barrel, and specially illustrated in Figs. 14–17. The pressure-sustaining tank 11, of Figs. 1 and 2, when suitably lagged with heat-insulating material, is very bulky, and reduces gangway space in a locomotive to a critical minimum. When trouble occurs, due to plugging of the individual ash separators in the encased battery, or from any other cause, as noted above, it is necessary to shut the entire plant down, and dismantle the tank 11, before the trouble can be located. When the trouble is remedied, the tank and its contained equipment have to be reassembled, all adding up to a very costly procedure, let alone loss of function of the power plant for considerable periods.

As will be readily apparent in considering the modifications illustrated in Figs. 3–17, and described in detail hereinafter, the pressurized tank 11, housing the battery of vortical whirl separators, is eliminated, and the individual separators are made pressure- sustaining, whereby they can be mounted on the outside of the dirty gas plenum chamber casings, where they are readily available for inspection, removal, and replacement, without requiring prolonged shutdown of the power plant and wholesale overhaul of the ash separating, concentrating and disposal system. The exposed separators are desirably lagged with suitable heat-insulating material, such as glass wool, which may be contained in demountable shields or housings mounted over the separators. The making of the barrel and discharge sections of the novel vortical whirl separators herein of heat-resisting stainless steel, in gauge thickness sufficient to render the devices pressure-sustaining, is a wholly novel idea, here presented for the first time, and is characterized by the fact that the initial fabrication and installation costs are but a minor fraction of the cost of the tank assembly illustrated in Figs. 1–2, and the maintenance and repair costs of the new installations are relatively small.

As noted above, one form of the improved ash separating and removal system is illustrated in Figs. 3–7. In this system, a symmetrically disposed pair of combustors 4, 4', severally incorporate expansible secondary air inlets 24, 24', discharge sections 42, 42' having end cap plates 43, 43', and downcomers 16, 16'. The downcomers 16, 16', as shown, incorporate the structural details of the downcomer duct, illustrated in detail in Fig. 2, including, respectively bottom elbow 17, 17', and flanged discharge ends 15, 15'. The combustors 4, 4', severally incorporate capped ports 80, 80', mounting the combustive air-coal and circulating oil lines connected to the burners, as specifically illustrated in Fig. 2. Spaced clean-out ports 81, 81', and 82, 82', are symmetrically disposed in the combustor casings, and are readily available from the two sides of the dual installation. A pair of combination flanged equilibrator ducts and stay members 83, 84, connect the interiors of the combustors 4, 4', adjacent the ends thereof, as shown, and establish isobaric equilibrium between the secondary air plenum chambers of the two combustors. A pair of parallel motive fluid conduits 90, 90', are severally mounted in subjacent relation to the combustors 4, 4', and are provided with flanged inlet ducts 91, 91' and flanged outlet ducts 92, 92', severally hermetically coupled to downcomers 16, 16', and cleaned gas expansion delivery ducts 12a, 12a'. Access ports 93, 93' are severally provided in the conduits 90, 90', as shown. The conduits 90, 90', in the form shown, are cylindrical, and are severally divided, longitudinally, in the direction of flow of the motive fluid, by diagonally sloping divider plates 94, 94', into mating cylindrical sections 95, 96, and 95', 96'. The plates 94, 94', are severally provided with upstream end riser sections 97, 97', hermetically secured to the inlet ducts 91, 91', and to the juxtaposed ends of the upper conduit segments 95, 95'. End closure plates 98, 98', are severally provided at the downstream ends of the divider plates, and are hermetically secured to the lower conduit segments 96, 96'. The upper and lower segments of the conduits, together with the interposed divider plates, and the end closures, are respectively hermetically secured to cooperating elements of the conduits by any suitable means, such as welding, designated generally by the numeral 99, and more particularly shown in Fig. 6.

It will be seen that the divider plates 94, 94', divide the casings into lower, dirty gas input plenum chambers 100, 100', of progressively decreasing cross-section, and into upper cleaned gas output plenum chambers, 101, 101', of inversely proportional increasing cross-section. The dirty gas is stripped of its contained solids, and the cleaned gas is delivered in the following manner: The barrels 71, of vortical whirl separators 70 are embouched in and conformed to apertures 102 in the bottom of the input plenum chambers. These barrels desirably have the lips 71a, of the conformed mouth sections, peened over against the inner surfaces of the plenum chambers, and conformed thereto, and they are hermetically sealed in place by welding, as indicated generally at 103, Fig. 6. As indicated hereinabove, the discharge ends of cleaned gas delivery tubes 78 are embouched in suitable apertures in the divider plates 94, 94', and are hermetically secured therein in any suitable manner, as by welding, indicated generally at 104 (Fig. 6).

The separated ash blowdown system of the motive fluid generator illustrated in Figs. 3–7, will now be described: As shown more particularly in Figs. 4–6, the ash separator conduits or plenum chamber casings 90, 90' are severally provided with parallel rows of staggered, depending vortical whirl separators 70. The ash blowdown lines 73 from the individual separators debouch into ash discharge manifolds, a manifold being provided for each row of separators. Referring to the sectional showing of Fig. 7, the manifolds for the rows of separators of unit 90, are designated 110, 111, while those for unit 90', are designated 112, 113. Manifolds 110, 111, jointly discharge into a take-off duct 114, while manifolds 112, 113 jointly discharge into take-off duct 115. The ducts 114, 115 are severally coupled to converging ducts 116, 117, which, in turn, are severally coupled to opposed tangential inlets 118, 119, of a small capacity vortical whirl ash concentrator 120, having a cleaned gas discharge tube 121, and a concentrated ash blowdown line 122. To cool the ash blowdown streams, the manifolds may be severally provided with cooled air line connections 32, as shown in Fig. 3, or, as shown in Fig. 3a, a fan or blower 125 may be coupled to the upstream each of a sheath 127, which may encase manifold 126. This member may also be provided with radially disposed extended surfaces or fins 128 exposed to the ambient air, or encased in sheath 127 (Fig. 3b), and cooling air blown through the radial passages formed by and between the sheath and the longitudinal fins.

The power plants herein, and as shown more in detail in Figs. 4 and 5, are mounted in locomotive cabs 130 having roofs 131, side walls 132, flooring 133, floor-supporting I-beams 134, and vertically disposed framing members 135 serving for the conjoint support of the side walls and superjacent roof structure. The power plant illustrated in Figs. 1 and 2, is mounted in the locomotive cab in the same manner, the turbo-generator equipment being used with all of the combustor-ash separator assemblies described herein.

The operation of the improved power plant of Figs. 3–7 is identical with that of the system illustrated in Figs. 1–2, with the added features that the ash separating and concentrating equipment is very much more compact, and is readily fabricated, installed and maintained, at a minimum of cost. Additionally, and importantly, the vortical whirl separators are readily available for inspection, and repair, without requiring prolonged shutdown of the entire power plant.

As discussed hereinabove, a feature of major importance in the design of any element of a power plant intended for use in locomotives is the restriction of the size of the element to the smallest dimensions possible, consonant with the performance required. In the case of pulverized coal-burning motive fluid generating equipment, all elements of the ash separating, ash concentrating, and storage equipment must be added to the equipment normally required for oil-burning gas turbine-powered generating electric locomotives. Such added equipment must be as compact as possible, simple to construct, service and repair, and exhibit an ash-separating efficiency beyond the capacity of any such equipment hitherto described, or available. In the novel design of the ash separating equipment forming the special feature of novelty in the systems illustrated in Figs. 8–17, the above recited desiderata are successfully attained, as will now be disclosed.

Turning to the detailed showings of Figs. 8, 12, 14, and 16, the improved ash-separating equipment will be seen to comprise a modified combustor discharge section, designated generally by the numeral 140, a modified and louvered deflector 150 mounted in section 140 of the combustor and directing motive fluid from the combustor downwardly into the fore chamber or dirty gas input plenum chamber of the vertically disposed, boxlike casing 160 embodying dirty gas input and cleaned gas output plenum chambers. Specially mounted batteries of horizontally disposed vortical whirl separators, of the type hereinabove described are hermetically coupled to the exterior of the casing 160, and establish fluid communication between the input and output plenum chambers thereof.

In the single combustor units illustrated in Figs. 8–10, 14–15, the combustors 4 are provided with modified discharge sections 140, of generally cylindrical shape, having flanged ends 141, and a body 142, capped by end cap plate 143. The body is provided with a rectangular cutout 144 on its under surface to receive the top of ash separator casing 160. The casing 160 is hermetically secured to the member 140 in any suitable manner, as by welding, indicated generally by the numeral 145. A louvered curviform deflector 150 is mounted in the end section 140 of the combustor, and divides the latter into an upper, clean secondary cooling air plenum chamber 146, and a lower, dirty motive fluid plenum chamber 147. The deflector 150 comprises a rear body portion 151 of partially curviform section terminating in a downwardly directed forward louver section 152 provided with louvers 153 on its upper surface.

The ash separator casing 160 is comprised of respectively apertured front and back walls 161, 162, integral side walls 163, 164, and integral bottom 165. A diagonally disposed, apertured separator or divider plate 166 is hermetically secured, as by welding, to the top edge of front wall 161, and to the side walls 163, 164, as well as to the bottom 165. The bottom edge of separator plate 166 is spaced from the rear wall 162, as shown. The plate 166 divides the casing 160 into an input plenum chamber 167 for ash and combustion residue-bearing motive fluid, which is in fluid communication with plenum chamber 147 of the combustor, and into a cleaned motive gas plenum chamber 168 which is in fluid communication with a turbine 10, or other use device, through expansion duct or ducts 12b. A cleanout port 169, for separated coarse combustion residues and ash, is provided at the base of input plenum chamber 167.

A feature of prime importance of the invention herein, and particularly of the ash separator system of the modifications presently under discussion, is the special mounting of the pressure-sustaining vortical whirl separators 70, described in detail hereinabove. In this form of the invention, the separators 70 are horizontally arranged, in batteries, designated generally by the numeral 170, in the following manner: The casings 71 of suitably aligned separators 70 are hermetically secured in appropriate apertures in rear wall 162 of plenum chamber casing 160 in any desired manner, as by welding, thereby placing the barrels of the individual separators in fluid communication with the dirty gas input plenum chamber 167. The mouths of cleaned gas discharge tubes 78, which severally bridge plenum chamber 167, are hermetically embouched, as by welding, in the partition member or divider plate 166, being received in aligned apertures therein, and establish fluid communication with the cleaned gas plenum chamber 168. The tangential ash blowdown lines 73, which, as noted above, severally discharge separated solids from the discharge sections 72 of separators 70, collectively discharge their motive fluid-borne separated solids into a depending ash discharge manifold 171 (Figs. 8 and 9), which is in fluid communication with the ash concentrating and storage units of the system, described in detail hereinabove. The ash blowdown lines 73 will be provided with individual flow restrictors, as shown, to prevent blowback of separated solids. The barrels of the horizontally disposed separators 70 are desirably cylindrical.

It will be seen that the ash separator system incorporating the novel plenum chamber casings 160 clearly fulfill the basic requirement of maximum ash separating efficiency with minimum bulk and weight of equipment. The heat conservation of the present system is effectively maintained by suitably lagging all exposed surfaces of the equipment with heat insulating material. The lagging of the exposed surfaces of the horizontally disposed, pressure-sustaining vortical whirl separators 70, which are mounted on the outside of the plenum chamber casing 160, may be effected in the following manner: A box-like housing or sheath 170, generally conformed to the rear wall 162 of the plenum chamber casing 160, is provided with flanged edges 171a, which are secured to the wall 162 in any suitable manner, as by machine screws, not shown. The housings 170 are filled with suitable low-cost heat-insulating material 173, such as glass wool, or asbestos fiber, which is packed in and around the horizontally disposed vortical whirl separators 70, so as to effectually insulate them and prevent any significant heat loss through the exposed surfaces thereof.

Turning to Figs. 12 and 13, there is shown the method of mounting duplex combustors and ash separator assemblies incorporating horizontally mounted, self-supporting, and pressure-sustaining vortical whirl separators. In this system, the duplex combustors 4, 4', are arranged in substantial parallelism, and are severally provided with modified end discharge sections 140, 140', debouching into input plenum chambers 167, 167', of the parallel, juxtaposed box-like plenum chamber casings 160, 160'. Each of these casings mounts a battery of vortical whirl separators, 170, 170', severally comprised of three separators, the horizontal axes of all the separators being arranged in parallelism and jointly intersecting the perimeter of a circle. In other words, the duplex array of separators is characterized by the fact that the axes of the several separators are equidistant from a common center. A common ash discharge manifold 175 is disposed between the batteries of separators 170, 170', and lies in the vertical plane coinciding with the vertical diameter of the turbine casing. The expansion ducts 12c, connecting the cleaned gas plenum chamber 168 and the turbine 10, are equal in number to the vortical whirl separators of the juxtaposed batteries, and are severally coaxial therewith. A common shield or housing, 176, is disposed over the separator batteries 170, 170', and is demountably secured to the casings 160, 160'. The usual heat insulating filling 173, of glass wool, asbestos fiber, or the like, is packed into the housing 176, and in and around the individual vortical whirl separators of the encased batteries. The common ash discharge manifold 175 receives the individual ash blowdown lines 73 of the vortical whirl separators 70, each said line being provided with a flow restriction, as at 73', to prevent blowback between the several separators. The ash discharge manifold 175 discharges to the ash concentrator 120 in the usual manner.

The combustor elements 140, 140', and the associated plenum chamber casings 160, 160', described immediately above, are also used in the modified ash separating systems illustrated in Figs. 14–17, and essentially characterized by the use of batteries of horizontally disposed vortical whirl separators having hexiform barrels and discharge chambers, which are mutually juxtaposed in honeycomb arrangements in the several batteries. Turning now to Figs. 14–15, the separator battery 180 is seen to comprise three vertical rows of hexiform separators, severally designated generally by the numeral 70A. The hexiform separators 70A are essentially similar to the cylindrical separators 70, which have been described in detail hereinabove, and this description will not be repeated, as it is not required for an understanding of the honeycomb arrangement of the horizontally disposed separators. The battery 180 is characterized further by the fact that the central row of separators extends rearwardly beyond the bilaterally juxtaposed rows to permit the coupling of the ash blowdown lines 73 of the middle separators to clear the ends of the discharge sections of the separators of the side rows. The blowdown lines 73 of the several rows are hermetically connected to blowdown manifolds 181, 182, 183, as shown in Fig. 15, and these manifolds are coupled to a common, horizontally disposed ash blowdown manifold 184, which discharges to a suitable ash concentrating and disposal system, as described hereinabove. The mouths of the barrels of the juxtaposed separators 70A may be separately hermetically embouched in rear wall 162 of plenum chamber casing 160, or they may be mutually hermetically joined, and the unitary array embouched in wall 162 in a single aperture conformed to the honeycomb-like periphery of the array, and hermetically secured thereto. With either of these arrangements, the barrels of the separators are placed in fluid communication with the input plenum chamber 167, and the cleaned gas discharge tubes 78 will traverse this chamber, and have their several mouths received in aligned apertures in divider plate or tube sheet 166, thereby establishing hermetic connection with the cleaned gas plenum chamber 168. The plenum chamber 168 discharges to the gas turbine 10 through the usual expansion duct 12d. A flanged, box-like housing or sheath 185 is mounted over the battery 180 and is detachably secured to the plenum chamber casing 160 in the usual manner. Heat-insulating material 173, of glass wool, asbestos fibers, or the like, will be packed in the housing 185, in contact with the exposed surfaces of the honeycomb array comprising separator battery 180.

In Figs. 16–17, there is shown a duplex combustor and ash separator system, generally similar to the system illustrated in Figs. 12–13, and described hereinabove. The new system is characterized by duplex honeycomb arrays of hexiform vortical whirl separators 70A, forming separator batteries, severally designated by the numerals 190, 190', and housed in a unitary, detachable box-like housing or sheath 191, incorporating the usual heat insulating filler 173. The batteries 190, 190', are mirror images of each other and severally comprise two vertical rows of separators hermetically embouched in plenum chamber casing walls 162, 162', respectively. The outside rows of the batteries are comprised of three separators, mutually abutted, and interfitted with juxtaposed inner rows comprised of four mutually abutted separators. The separators are coaxial with a like number of expansion ducts 12e connecting the cleaned gas plenum chamber 168 and the turbine 10. Each array of separators is hermetically embouched in suitably conformed apertures in walls 162, 162', of plenum chamber casings 160, 160'. In the system shown in Figs. 16–17, it will be seen that the separators 70A are of uniform length. As shown more particularly in Fig. 17, the ash blowdown lines 73, severally provided with flow restrictors, debouch into vertical manifolds 192, 193, 194, which, in turn, debouch into common ash discharge manifold 195. Manifold 195 discharges to the final ash concentrating and storage stage, as described hereinabove. Manifolds 192, 193, and 194 are severally provided with flow restrictors to prevent blowback from the common ash discharge manifold 195.

There have been described and illustrated louvered ash separating and cooling systems capable of performing and effecting all of the specifically mentioned features of novelty and advantage of the invention, as well as others which are apparent to those skilled in the art. Various uses of the present invention may be made using the described structures. Accordingly, it is apparent that variations as to operation, size and shape, and rearrangement of the elements may be made without departing from the spirit of the invention. Therefore, limitation is sought only in accordance with the scope of the following claims.

What is claimed is:

1. In a gaseous motive fluid generator of the character described and incorporating a film cooled combustion chamber or flame tube mounted in and spaced from a combustor casing, together with a primary air-borne pulverized fuel burner, a battery of vortical whirl separators having inlet and outlet plenum chambers, means for delivering the resultant solids-bearing heated motive fluid to the battery of separators, and a use device receiving the cleaned motive fluid from the separators, the improvements comprising a curvilinear duct connecting the flame tube and the input plenum chamber of the separator battery, the upper part of the duct being encased in the combustor casing, said upper part of the duct being louvered in the concave portion thereof, whereby to direct secondary air from the combustor casing downwardly into the duct in the direction of flow of the motive fluid from the flame tube, and means at bottom part of said duct, below the combustor, for the collection and removal of combustion residues entrained in said secondary air.

2. In a gaseous motive fluid generator of the character describe dand incorporating a film cooled combustion chamber or flame tube mounted in and spaced from a combustor casing, together with a primary air-borne pulverized fuel burner, a battery of vortical whirl separators having inlet and outlet plenum chambers, means for delivering secondary air to the combustor casing, means for delivering the resultant solids-bearing heated motive fluid to the battery of separators, and a use device receiving the cleaned motive fluid from the separators, the improvements comprising a U-shaped duct connecting the flame tube and the inlet plenum chamber of the separator battery, the said battery being subjacent the combustor, and louvered openings in the upper bend of the U-duct oriented to project secondary air downwardly from the combustor casing against the vertically disposed rear wall of the U-duct, whereby coarse ash and agglomerated combustion residues carried in the motive fluid from the flame tube are projected rectilinearly into said down-flowing secondary air and quenched therein, the fine ash particles being carried into the separator battery in the motive fluid stream, and the coarse ash and agglomerated combustion residues are deposited in the bottom leg of the U-duct.

3. In a motive fluid generator of the character described having a cold wall combustor casing incorporating a flame tube comprised of overlapping spaced rings, and ash separator means connected to the combustor casing, the space between the casing and the flame tube serving as a plenum chamber for the reception and distribution of secondary air, the improvements comprising curviform louver means at the discharge end of the flame tube and in fluid communication with said plenum chamber, whereby secondary air from the plenum chamber is caused to flow against the inner curviform surfaces of said louver means, the gaseous discharge of the flame tube being projected rectilinearly against the inner concave surfaces of the louver means; depending duct means connecting said curviform louver means and said ash separator means, said ash separator means having an input plenum chamber in fluid communication with said depending duct means, and an output plenum chamber discharging to a use device, together with an interposed battery of self-supporting, pressure-sustaining reverse flow vortical whirl separators severally comprised of a casing having an axial cleaned air discharge and circumjacent vortical whirl-imparting dirty air inlet means, each separator having at least one tangential blowdown line at the base thereof; coarse combustion residue-receiving and discharge means at the base of the said input plenum chamber; manifold means incorporating air cooling means and receiving the discharge ends of said several blow down lines, whereby the fly ash-containing blowdown streams are cooled, said blowdown lines severally incorporating flow restrictors, whereby blowback into any of the separators is prevented; and an ash concentrator, comprising a vortical whirl separator of the type described coupled to the said manifold means, said ash concentrator having an input capacity substantially equivalent to the aggregate volumes of the blowdown streams from the individual separators plus coolant air introduced into the manifold, whereby with an integral quantum of motive fluid used in the blowdown stream from each vortical whirl separator of the separator battery, the volume of ash-carrying motive fluid discharged in the blowdown line from the ash concentrator will amount to less than two percent of the total volume of motive fluid treated.

4. In a gaseous motive fluid generator of the character described and incorporating a segmented, film-cooled combustion chamber comprised of coaxial spaced rings mounted in and spaced from a combustor casing, a primary air-borne pulverized fuel burner at the upstream end of the combustion chamber; a battery of vortical whirl separators having conjoint inlet and outlet plenum chambers, the said separators severally comprising casings having axially outlet means for cleaned gas, and circumjacent vortical whirl-imparting means for incoming dirty air; discharge means for separated ash comprising tangential blowdown lines at the bases of the separators; a secondary air supply and means for delivering secondary air to the combustor casing and mixing same with the gaseous products of combustion from the burner to form a dirty motive fluid; means for delivering the resultant solids-bearing, heated motive fluid to the battery of separators, and a use device receiving the cleaned motive fluid from the said battery, the improvements comprising depending duct means connecting the combustion chamber and the inlet plenum chamber of the separator battery, said duct being disposed generally at right angles to the axis of the combustion chamber; curviform louver means in the combustor casing and joining the upper half of the downstream end of the combustion chamber to the top of said duct, said louver means effective to direct secondary air against the curved inner wall of the louver means, whereby the rectilinearly projected, ash-bearing motive fluid from the combustion chamber is apposed to the down-flowing film of relatively cool secondary air contacting the downstream side of the louvers and the subjoined duct, and the coarse combustion residues of the motive fluid are received in said film of cool, secondary air and quenched thereby and therein; means at the base of the inlet plenum chamber of the separator battery for receiving and removing the quenched solids from the motive fluid, the inlet plenum chamber discharging fly ash-bearing motive fluid to the separator battery; at least one manifold receiving blowdown lines from the individual vortical whirl separators, the said blowdown lines severally incorporating flow restrictor means, whereby blowback between the separators is prevented; an ash concentrator comprising a separate vortical whirl separator of the character hereinabove described; conduit means establishing fluid communication between said manifold and the inlet of said ash concentrator, said conduit incorporating flow reducing means, whereby the consolidated fly ash-containing blowdown stream from the separator battery is processed at substantially atmospheric pressure; and means for receiving and storing the fly ash discharged from said ash concentrator.

5. In an ash separator-equipped pressurized combustion system for burning powdered coal in a combustor, as a streaming entrainment of discrete particles in a combustive air stream and characterized by the fact that <50–60 percent of the original combustible particles are discharged in unburned or incompletely burned condition, with the ash and other solid combustion residues entrained in the gaseous products of combustion, and which combustible particulate residues are normally susceptible of after-burning in the ash-separating equipment, the improved combustion residue-quenching and -separating means comprising a depending duct connecting the combustor and the separator and including at least a top elbow bend at the junction of the combustor and the duct, whereby solid combustion residues carried in the stream of gaseous combustion products from the combustor are rectilinearly projected from out of said stream against said elbow, and separated from said gaseous combustion products; a coolant air supply disposed about said elbow; louvred openings in said elbow so oriented as to deflect coolant air against the downstream side of said elbow and subjoined duct, whereby incandescent ash and incompletely burned combustible combustion residues rectilinearly projected out of the stream of gaseous products of combustion are received in the downflowing coolant air stream, and quenched and asported therein and thereby.

6. In a pressurized motive fluid generator of the class described wherein residue-forming particulate fuels are burned in pressurized combustive air streams, and the resulting gaseous products of combustion entrain fine and coarse ash, incompletely burned fuel particles, and other solid combustion residues, and said solids are separated from the gaseous products of combustion in a battery of reverse flow vortical whirl separators having separated solids blowdown means and a common dirty gas input plenum chamber, the improvements comprising an L-shaped combustor of uniform cross-sectional area horizontally disposed with the short leg of the L forming a downcomer duct for the products of combustion and being in free fluid communication with the said dirty gas input plenum chamber; a curviform deflector in the elbow (or angle of the L) so constituted and arranged as to deflect the gaseous products of combustion downwardly from the long leg or combustion chamber of the L into the depending short leg; louvre means in the upper surface of said curviform deflector; and gaseous coolant supply means including a chambered casing spacedly disposed about the said elbow.

7. Pressurized motive fluid generator according to claim 6, characterized by the fact that the legs of the combustor are in free fluid communication and are of substantially common cross-sectional area.

8. An apparatus for the conjoint quenching and separation of gasiform fluid-borne, heated particulate solids, from a carried fluid, comprising, in combination, a generally L-shaped duct, so configured and arranged that its long leg is horizontally disposed and the short leg is depending, and coolant gasiform inlet means comprising a foraminous curviform deflector mounted in the angle of the L, and forming a coolant fluid plenum chamber with the L, whereby when a coolant gasiform fluid is supplied to the plenum chamber and a stream of heated, gasiform fluid-borne, differentially sized particulate solids is caused to flow through the long leg of the L into the short leg, the coolant fluid is directed against the downstream side of the short leg and the heated solids-bearing stream is rectilinearly projected against the deflector and deflected thereby downwardly into the said short leg, while the heavier stream-borne particulate solids are rectilinearly projected against the deflector and into the downstreaming coolant fluid wherein they are quenched, and collector means at the base of the short leg adapted to receive the quenched solids.

9. Quenching and separating apparatus according to claim 8, characterized by the fact that the legs of the duct, and the collector means are of substantially uniform cross-sectional area, whereby uniform flow conditions are maintained therein and therethrough.

10. Quenching and separating apparatus according to claim 8, characterized by the fact that the openings in the deflector have depending lips, whereby the coolant fluid is deflected toward the downstream surface of the short leg.

11. Quenching and separating apparatus according to claim 10, characterized by the fact that the openings in the deflector form transverse louvres.

12. Quenching and separating apparatus according to claim 8, characterized by the fact that the collector means at the base of the short leg serves as a mixing chamber for the downstreaming coolant gasiform fluid and the stream of heated gasiform fluid with its residual dispersed particulate solids content, and a second solids separator means is coupled to the mixing chamber and serves as an efferent take-off for the mixing chamber.

13. Quenching and separating apparatus according to claim 12, characterized by the fact that the second solids separator means is comprised of at least one battery of reverse flow vortical whirl separators, severally incorporating vortex reflectors and blowdown lines for separated solids, the blowdown lines embouching in common manifold means, and a unitary vortical whirl separator receives the separated solids-bearing blowdown streams from the manifold means and serves to further concentrate the separated solids.

14. Quenching and separating apparatus according to claim 13, characterized by the fact that a cleaned gas plenum chamber is hermetically coupled to the cleaned gas discharge tubes of the reverse flow vortical whirl separators.

15. Quenching and separating apparatus according to claim 14, characterized by the fact that the mixing chamber serves as a dirty gas plenum chamber and forms a plenum chamber casing with the cleaned gas plenum chamber, the casing incorporating a slope plate forming the common wall between the plenum chambers.

References Cited in the file of this patent

UNITED STATES PATENTS

| | | |
|---|---|---|
| 356,837 | Howard | Feb. 1, 1887 |
| 2,479,376 | Lemaire | Aug. 16, 1949 |
| 2,491,434 | Yellott | Dec. 13, 1949 |
| 2,491,435 | Yellott | Dec. 13, 1949 |
| 2,654,350 | Fitzpatrick | Oct. 6, 1953 |